United States Patent
Lee (10) Patent No.: US 9,020,028 B2
(45) Date of Patent: Apr. 28, 2015

(54) TRANSMITTER CIRCUIT, RECEIVER CIRCUIT, AND TRANSMITTING/RECEIVING SYSTEM

(71) Applicant: SK Hynix Inc., Gyeonggi-do (KR)

(72) Inventor: Hyun-Woo Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 27 days.

(21) Appl. No.: 13/844,862

(22) Filed: Mar. 16, 2013

(65) Prior Publication Data

US 2014/0140431 A1 May 22, 2014

(30) Foreign Application Priority Data

Nov. 22, 2012 (KR) .......................... 10-2012-0132965

(51) Int. Cl.
- H04B 1/06 (2006.01)
- H04L 27/06 (2006.01)
- H04L 27/04 (2006.01)
- H04L 7/02 (2006.01)
- H04L 7/00 (2006.01)
- H04L 25/03 (2006.01)

(52) U.S. Cl.
CPC .............. *H04L 27/066* (2013.01); *H04L 27/04* (2013.01); *Y02B 60/31* (2013.01); *H04L 7/02* (2013.01); *H04L 7/0008* (2013.01); *H04L 25/03* (2013.01)

(58) Field of Classification Search
USPC .......................................................... 375/257
See application file for complete search history.

(56) References Cited

U.S. PATENT DOCUMENTS

| | | | | |
|---|---|---|---|---|
| 2004/0153954 | A1* | 8/2004 | Allen et al. .................... | 714/795 |
| 2008/0267417 | A1* | 10/2008 | Wang ............................... | 381/56 |
| 2009/0074407 | A1* | 3/2009 | Hornbuckle et al. ........... | 398/43 |
| 2010/0040123 | A1* | 2/2010 | Iwata et al. .................... | 375/220 |
| 2010/0066443 | A1* | 3/2010 | Yamamoto et al. ........... | 329/347 |
| 2010/0091921 | A1* | 4/2010 | Den Besten et al. .......... | 375/354 |
| 2011/0242066 | A1 | 10/2011 | Jeon et al. | |

FOREIGN PATENT DOCUMENTS

KR 100875667 12/2008

* cited by examiner

*Primary Examiner* — Erin File
(74) *Attorney, Agent, or Firm* — IP & T Group LLP (57) ABSTRACT

A transmitting/receiving system may include a transmission line, a transmitter circuit configured to transmit a clock to the transmission line and to adjust an amplitude of the clock in accordance with a logic level of data, and a receiver circuit configured to receive the clock transferred to the transmission line and to recover the data through detection of the amplitude of the clock.

13 Claims, 7 Drawing Sheets

TRANSMITTER CIRCUIT, RECEIVER CIRCUIT, AND TRANSMITTING/RECEIVING SYSTEM

CROSS-REFERENCE TO RELATED APPLICATIONS

The present application claims priority of Korean Patent Application No. 10-2012-0132965, filed on Nov. 22, 2012, which is incorporated herein by reference in its entirety.

BACKGROUND

1. Field

Exemplary embodiments of the present invention relate to a data transmitting/receiving technology.

2. Description of the Related Art

Various integrated circuit chips do not operate alone, but operate to send/receive data with peripheral chips. For example, memory chips, such as a DRAM and a flash memory, send/receive data with a memory controller, and a CPU also sends/receives data with various chips on a motherboard.

Figure 1:
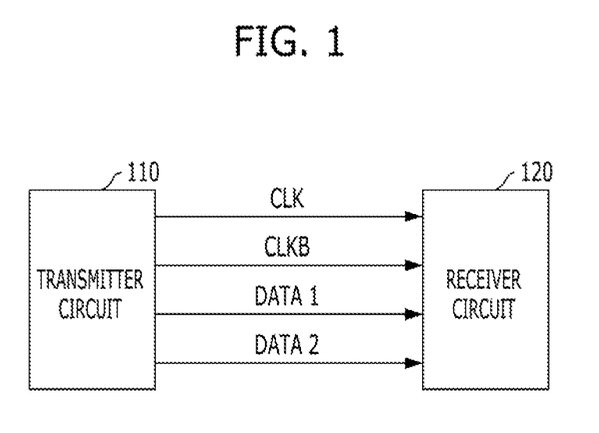
FIG. 1 is a diagram illustrating a data transmitting method between a transmitter circuit 110 and a receiver circuit 120 in the related art.

FIG. 1 is a diagram illustrating a data transmitting method between a transmitter circuit 110 and a receiver circuit 120 in the related art.

Referring to FIG. 1, the transmitter circuit 110 transmits data DATA1 and DATA2 to the receiver circuit 120 together with clocks CLK and CLKB. Then, the receiver circuit 120 receives the data DATA1 and DATA2 in synchronization with the clocks CLK and CLKB. In order to stably send/receive high-frequency (high-speed) data, clocks that are synchronized with the data are essential and most high-speed transmitting/receiving systems use the data transmitting method as illustrated in FIG. 1.

Some transmitting system transmits data without clock and corresponding receiving system recovers a clock included in the data transmitted from the transmitting system using a clock data recovery circuit, which consumes a large amount of current and performs unstable operation, such as a clock generator.

SUMMARY

Various embodiments of the present invention are directed to a technology that may transmit/receive a clock and data together through one line with less consumption of current and stable high-speed operation.

In an embodiment, a transmitting/receiving system may include a transmission line, a transmitter circuit configured to transmit a clock to the transmission line and to adjust an amplitude of the clock in accordance with a logic level of data, and a receiver circuit configured to receive the clock transferred to the transmission line and to recover the data through detection of the amplitude of the clock.

In an embodiment, a transmitter circuit may include a first driver configured to drive a clock on a transmission line, and a second driver configured to drive the clock on the transmission line, and to be activated if data is of a first level and to be inactivated if the data is of a second level.

In an embodiment, a receiver circuit may include a clock receiving unit configured to recover a clock through detection of logic high and logic low of a signal received through a transmission line, and a data receiving unit configured to recover data through detection of an amplitude of the signal received through the transmission line.

In another embodiment, a transmitting/receiving system may include a first transmission line, a second transmission line, a first transmitting unit configured to transmit a positive clock to the first transmission line and to adjust an amplitude of the positive clock in accordance with a logic level of first data, a second transmitting unit configured to transmit a negative clock to the second transmission line and to adjust an amplitude of the negative clock in accordance with a logic level of second data, and a receiver circuit configured to receive the first clock and the second clock transferred to the first transmission line and the second transmission line, to recover the first data through detection of the amplitude of the received positive clock, and to recover the second data through detection of the amplitude of the received negative clock.

In another embodiment, a receiver circuit may include a clock receiving unit configured to recover a first clock and a second clock through comparison of a signal received through a first transmission line with a signal received through a second transmission line, and a data receiving unit configured to recover first data through detection of an amplitude of the signal received through the first transmission line and to recover second data through detection of an amplitude of the signal received through the second transmission line.

In another embodiment, a transmitting/receiving system may include a transmitter circuit configured to generate a clock whose peak amplitude varies in accordance with a logic level of data to be transmitted and to transmit the clock as a signal, and a receiver circuit configured to recover the clock based on a logical level of the signal received from the transmitter circuit and to recover the data based on a amplitude of the received signal.

According to embodiments of the present invention, since the clock modulated by data is transmitted via one transmission line, the number of lines required to transmit the data may be reduced, and a stable high-speed operation may be achieved.

Further, it is not necessary to use a clock data recovery circuit based on a clock generator that may involve complicated circuit and a large amount of current.

DETAILED DESCRIPTION

Various exemplary embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. In addition, a singular form may include a plural form as long as it is not specifically mentioned in a sentence.

The drawings are not necessarily to scale and in some instances, proportions may have been exaggerated in order to clearly illustrate features of the embodiments.

Figure 2:
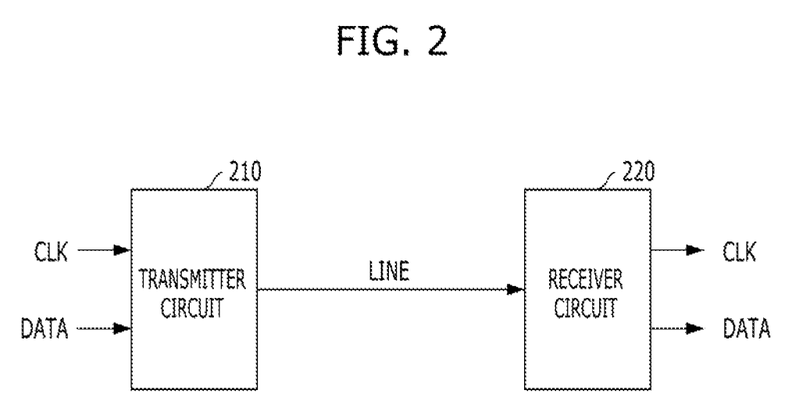
FIG. 2 is a diagram illustrating the configuration of a transmitting/receiving system in accordance with an embodiment of the present invention.

FIG. 2 is a diagram illustrating the configuration of a transmitting/receiving system in accordance with an embodiment of the present invention.

Referring to FIG. 2, a transmitting/receiving system includes a transmitter circuit 210, a receiver circuit 220, and a transmission line LINE. The transmitter circuit 210 and the receiver circuit 220 may be arranged in different integrated circuit chips, or in the same chip, which may vary according to a design.

The transmitter circuit 210 transmits a clock CLK to the receiver circuit 220 through the transmission line LINE. Amplitude of the clock CLK transmitted by the transmitter circuit 210 depends on a value of data DATA. The transmitter circuit 210 transmits the clock CLK with relatively greater amplitude when the data DATA to be transmitted is "1". On the other hand, the transmitter circuit 210 transmits the clock CLK with relatively smaller amplitude when the data DATA to be transmitted is "0". That is, the transmitter circuit 210 transmits the clock CLK, of which the amplitude varies depending on the value of the data DATA to be transmitted.

The receiver circuit 220 receives a signal or the clock CLK transmitted from the transmitter 210 via the transmission line LINE, and if the logic level of the received signal is "1", the receiver circuit 220 identifies the received signal as the clock CLK, which has a value of "1", while if the logic level of the received signal is "0", the receiver circuit 220 identifies the received signal as the clock CLK, which has a value of "0". Further, the receiver circuit 220 identifies the data DATA sent from the transmitter 210 as "0" or "1" based on the amplitude of the received signal.

Figure 3:
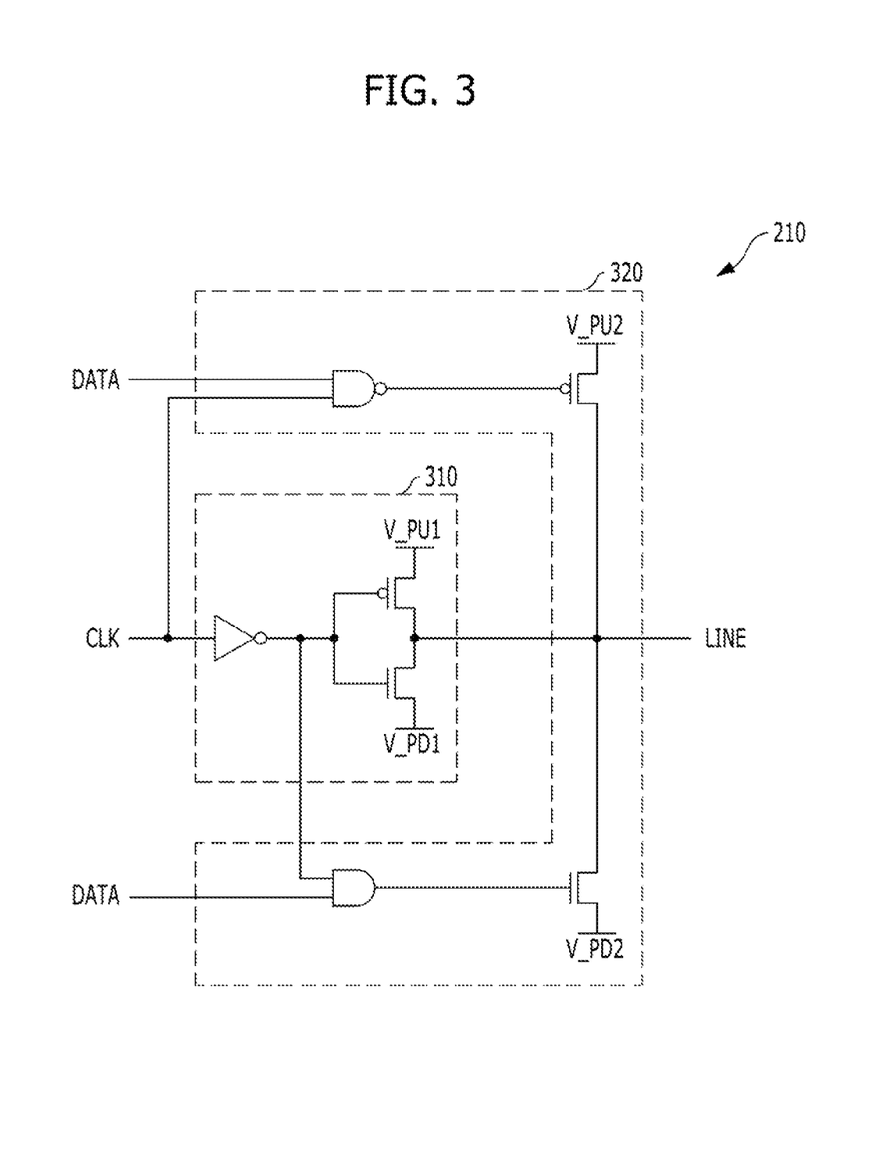
FIG. 3 is a diagram illustrating the configuration of a transmitter circuit 210 shown in FIG. 2 in accordance with an embodiment of the present invention.

FIG. 3 is a diagram illustrating the configuration of a transmitter circuit 210 shown in FIG. 2 in accordance with an embodiment of the present invention.

Referring to FIG. 3, the transmitter circuit 210 includes a first driver 310 and a second driver 320.

The first driver 310 receives and drives the clock CLK on the transmission line LINE. A first pull-up voltage V_PU1 for pull-up driving of the transmission line LINE and a first pull-down voltage V_PD1 for pull-down driving of the transmission line LINE are supplied to the first driver 310.

The second driver 320 also drives the clock CLK on the transmission line LINE. However, the second driver 320 is activated when the data DATA to be transmitted has a value of "1", and is inactivated when the data DATA to be transmitted has a value of "0". That is, the second driver 320 drives the clock CLK on the transmission line LINE if the data DATA to be transmitted has the value of "1", but does not drive the clock CLK on the transmission line LINE if the data DATA to be transmitted has the value of "0". A second pull-up voltage V_PU2 for pull-up driving of the transmission line LINE and a second pull-down voltage V_PD2 for pull-down driving of the transmission line LINE are supplied to the second driver 320. The second pull-up voltage V_PU2 is higher than the first pull-up voltage V_PU1, and the second pull-down voltage V_PD2 is lower than the first pull-down voltage V_PD1.

If the value of the data DATA input to the transmitter circuit 210 is "0", only the first driver 310 drives the clock CLK on the transmission line LINE. On the other hand, if the value of the data DATA is "1", the first driver 310 and the second driver 320 simultaneously drive the clock CLK on the transmission line LINE. Accordingly, the amplitude of the clock CLK driven on the transmission line LINE is changed depending on the value of the data DATA.

Although FIG. 3 illustrates that the pull-up voltages V_PU1 and V_PU2 and the pull-down voltages V_PD1 and V_PD2 that are supplied to the first driver 310 and the second driver 320 are different from each other, the same pull-up voltage and the same pull-down voltage (that is, V_PU1=V_PU2 and V_PD1=V_PD2) may be supplied to the first driver 310 and the second driver 320. Even though the first driver 310 and the second driver 320 use the same pull-up voltage and the same pull-down voltage, the amplitude of the clock CLK driven on the transmission line LINE may be changed depending on the value of the data DATA because there is a difference in driving force on the clock CLK when only the first driver 310 drives the clock CLK and when both the first driver 310 and the second driver 320 drive the clock CLK.

Figure 4:
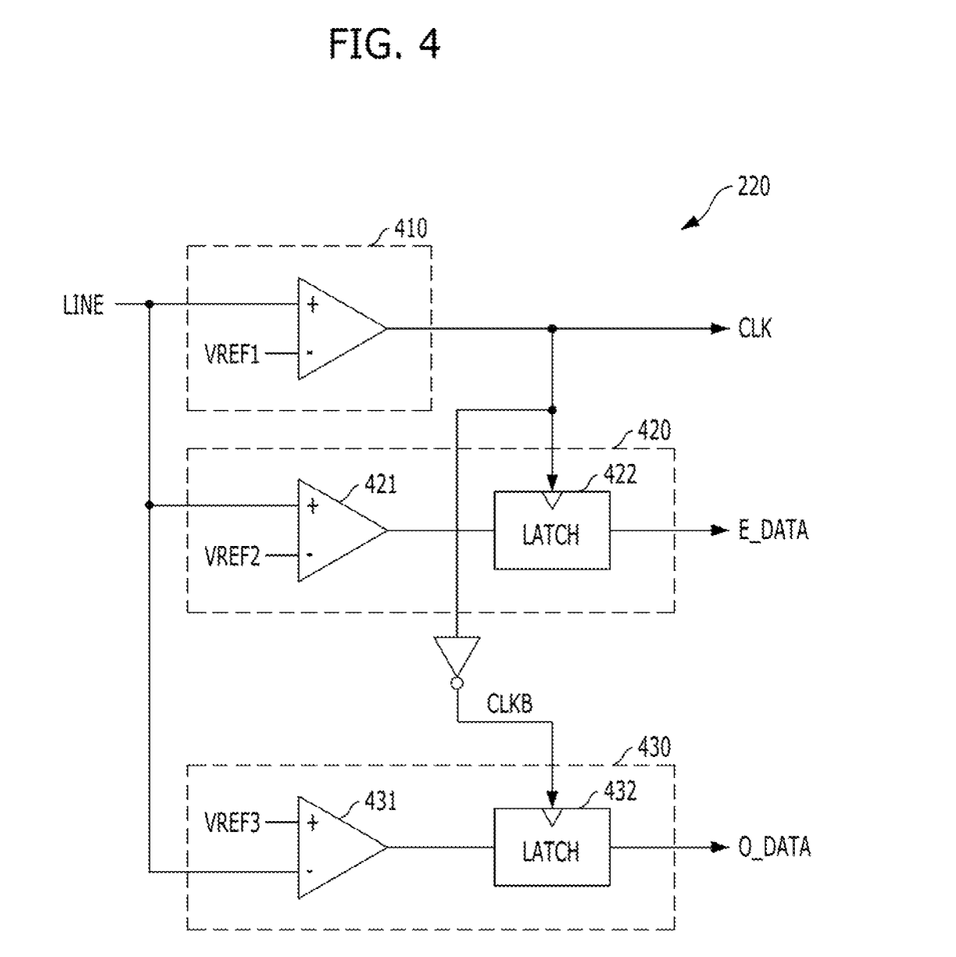
FIG. 4 is a diagram illustrating the configuration of a receiver circuit 220 shown in FIG. 2 in accordance with an embodiment of the present invention.

FIG. 4 is a diagram illustrating the configuration of a receiver circuit 220 shown in FIG. 2 in accordance with an embodiment of the present invention.

Referring to FIG. 4, the receiver circuit 220 includes a clock receiving unit 410 recovering the clock CLK and a data receiving unit 420 and 430 recovering the data DATA. The data receiving unit includes an even data receiving unit 420 and an odd data receiving unit 430.

The clock receiving unit 410 recovers the clock CLK through comparison of the signal transmitted from the transmitter 210 via the transmission line LINE with a first reference voltage VREF1. If the voltage level of the received signal is higher than the voltage level of the first reference voltage VREF1, the clock receiving unit 410 recovers the value of the clock CLK to "1", and if the voltage level of the received signal is lower than the voltage level of the first reference voltage VREF1, the clock receiving unit 410 recovers the value of the clock CLK to "0". Here, the first reference voltage VREF1 is a reference voltage for determining whether the logic level of the received signal is "1" or "0".

The even data receiving unit 420 recovers even data E_DATA from the received signal. The even data E_DATA is synchronized with a period of logic level "1" of the clock CLK. The even data receiving unit 420 recovers the even data E_DATA by comparing the level of the received signal with a level of a second reference voltage VREF2 and by sampling the result of comparison in synchronization with the clock CLK. The even data receiving unit 420 may include a differential buffer 421 and a latch 422. The differential buffer 421 compares the received signal with the second reference voltage VREF2, and outputs a signal that has logical value of "1" if the received signal is higher than the second reference voltage VREF2, and outputs a signal that has logical value of "0" if the received signal is lower than the second reference voltage VREF2. Further, the latch 422 latches the output of the differential buffer 421 in synchronization with the level "1" of the clock CLK. The signal latched in the latch 422 becomes the even data E_DATA. Here, the second reference voltage VREF2 is a reference voltage that is higher than the first reference voltage VREF1. A value of the second reference voltage VREF2 is set between the relatively greater amplitude and the relatively smaller amplitude of the clock CLK that has logical level of "1". As described above in connection with FIG. 2, the transmitter circuit 210 transmits the clock CLK with relatively greater amplitude when the data DATA to be transmitted is "1", while with relatively smaller amplitude when the data DATA to be transmitted is "0".

The odd data receiving unit 430 recovers odd data O_DATA from the received signal. The odd data O_DATA is synchronized with a period of logic level "0" of the clock CLK. The odd data receiving unit 430 recovers the odd data O_DATA by comparing the level of the received signal with a level of a third reference voltage VREF3 and by sampling the result of comparison in synchronization with a reverse signal CLKB of the clock CLK. The odd data receiving unit 430 may include a differential buffer 431 and a latch 432. The differential buffer 431 compares the received signal with the third reference voltage VREF3, and outputs a signal whose logical value is "1" if the received signal is lower than the third reference voltage VREF3 and outputs a signal whose logical value is "0" if the received signal is higher than the third reference voltage VREF3. Further, the latch 432 latches the output of the differential buffer 431 in synchronization with the level "1" of the signal CLKB, or level "0" of the clock CLK. The signal latched in the latch 432 becomes the odd data O_DATA. Here, the third reference voltage VREF3 is a reference voltage that is lower than the first reference voltage VREF1. An absolute value of the third reference voltage VREF3 is set between the relatively greater amplitude and the relatively smaller amplitude of the clock CLK that has a logical level of "1".

Figure 5:
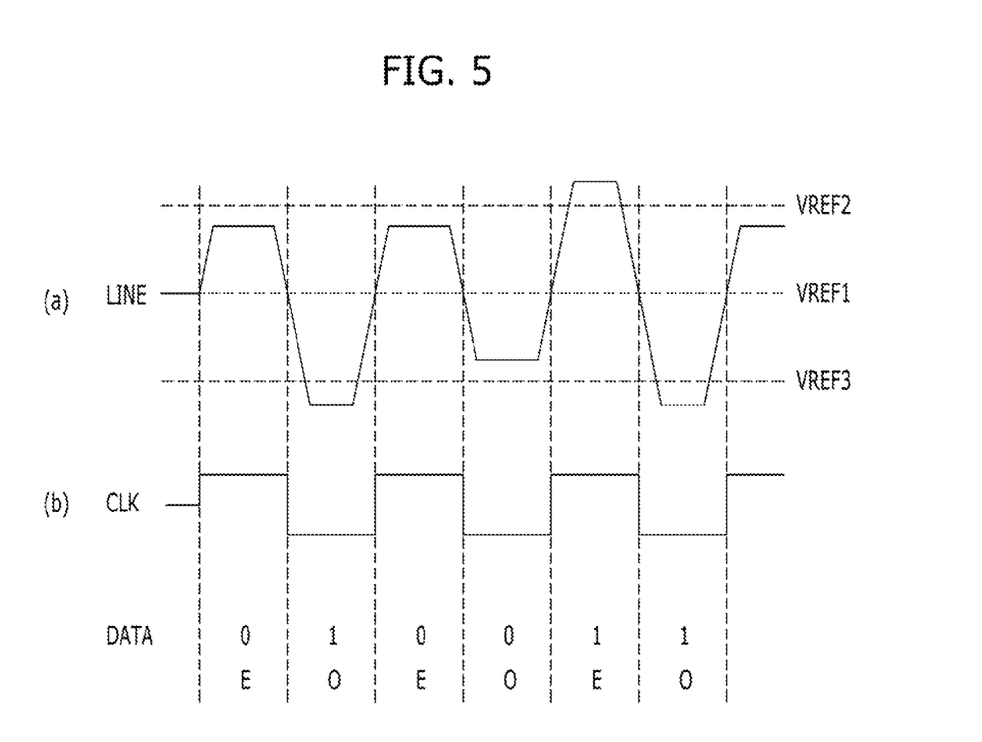
FIG. 5 is a diagram explaining operations of the transmitter circuit 210 and the receiver circuit 220 illustrated in FIGS. 2 to 4.

FIG. 5 is a diagram explaining operations of the transmitter circuit 210 and the receiver circuit 220 illustrated in FIGS. 2 to 4.

The level of the signal transmitted from the transmitter circuit 210 is shown in (a) of FIG. 5, and the levels of the clock CLK and the data DATA recovered by the receiver circuit 220 are shown in (b) of FIG. 5. In (b) of FIG. 5, data indicated by "E" denotes the even data E_DATA recovered by the even data receiving unit 420, and data indicated by "O" denotes the odd data O_DATA recovered by the odd data receiving unit 430.

Referring to FIG. 5, the transmitter circuit 210 adjusts the amplitude of the clock CLK in accordance with the level of the data DATA, and the receiver circuit 220 recovers the clock CLK using the logical value of the signal transmitted from the transmitter circuit 210 and recovers the data DATA using the amplitude of the signal transmitted from the transmitter circuit 210.

Figure 6:
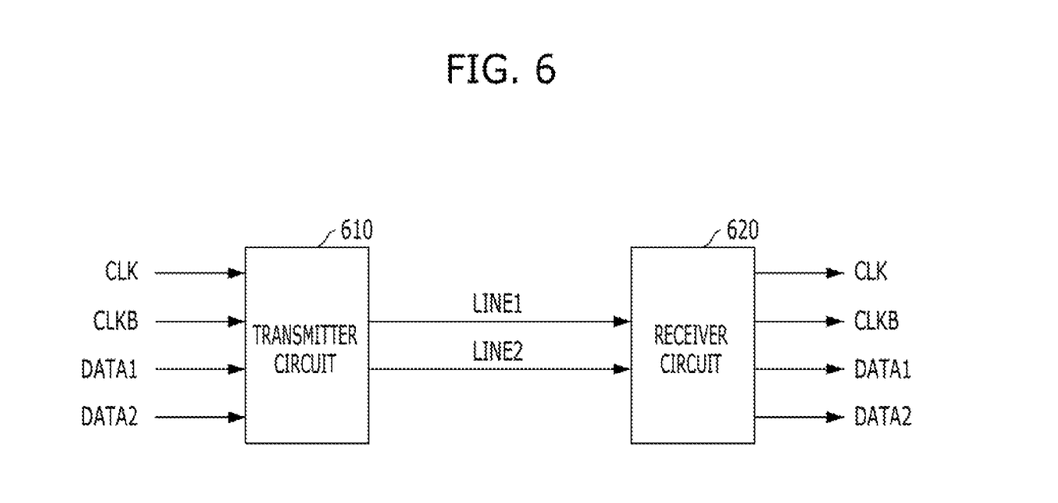
FIG. 6 is a diagram illustrating the configuration of a transmitting/receiving system in accordance with another embodiment of the present invention.

FIG. 6 is a diagram illustrating the configuration of a transmitting/receiving system in accordance with another embodiment of the present invention. With reference to FIG. 6, the transmitting/receiving system using clocks of differential type or clocks CLK and CLKB will be described.

Referring to FIG. 6, the transmitting/receiving system includes a transmitter circuit 610 and a receiver circuit 620. Transmitter circuit 610 and the receiver circuit 620 may be arranged in different integrated circuit chips, or in the same chip, which may vary according to a design.

The transmitter circuit 610 transmits a positive clock CLK to the receiver circuit 620 through a first transmission line LINE1, and transmits a negative clock CLKB through a second transmission line LINE2. Amplitudes of the clocks CLK and CLKB to be transmitted depends on values of data DATA1 and DATA2, respectively. The transmitter circuit 610 transmits the positive clock CLK on the first transmission line LINE1 with relatively greater amplitude when the first data DATA1 to be transmitted is "1". On the other hand, the transmitter circuit 610 transmits the positive clock CLK on the first transmission line LINE1 with relatively smaller amplitude when the first data DATA1 to be transmitted is "0". Further, the transmitter circuit 610 transmits the negative clock CLKB on the second transmission line LINE2 with relatively greater amplitude when the second data DATA2 to be transmitted is "1". On the other hand, the transmitter circuit 610 transmits the negative clock CLKB on the second transmission line LINE2 with relatively smaller amplitude when the second data DATA2 to be transmitted is "0". That is, the transmitter circuit 610 transmits the clocks CLK and CLKB, of which the amplitudes are changed depending on the values of the data DATA1 and DATA2 to be transmitted on the transmission lines LINE1 and LINE2, respectively.

The receiver circuit 620 receives signals or the clocks CLK and CLKB transmitted from the transmitter 610 via the transmission lines LINE1 and LINE2, and if the logic level of the signal of the first transmission line LINE1 is "1", the receiver circuit 620 identifies the signal on the first transmission line LINE1 as the positive clock CLK of logical value "1", while if the logic level of the signal of the first transmission line LINE1 is "0", the receiver circuit 620 recognizes the signal on the first transmission line LINE1 as the positive clock CLK of logical value "0". Further, the receiver circuit 620 identifies the first data DATA1 sent from the transmitter 210 as "0" or "1" based on the amplitude of the signal on the first transmission line LINE1. Further, if the logic level of the signal of the second transmission line LINE2 is "1", the receiver circuit 620 recognizes the signal on the second transmission line LINE2 as the negative clock CLKB of logical value "1", while if the logic level of the signal of the second transmission line LINE2 is "0", the receiver circuit 620 recognizes the signal on the second transmission line LINE2 as the negative clock CLKB of logical value "0". Further, the receiver circuit 620 recognizes the second data DATA2 sent from the transmitter 210 as "0" or "1" based on the amplitude of the signal on the second transmission line LINE2.

Figure 7:
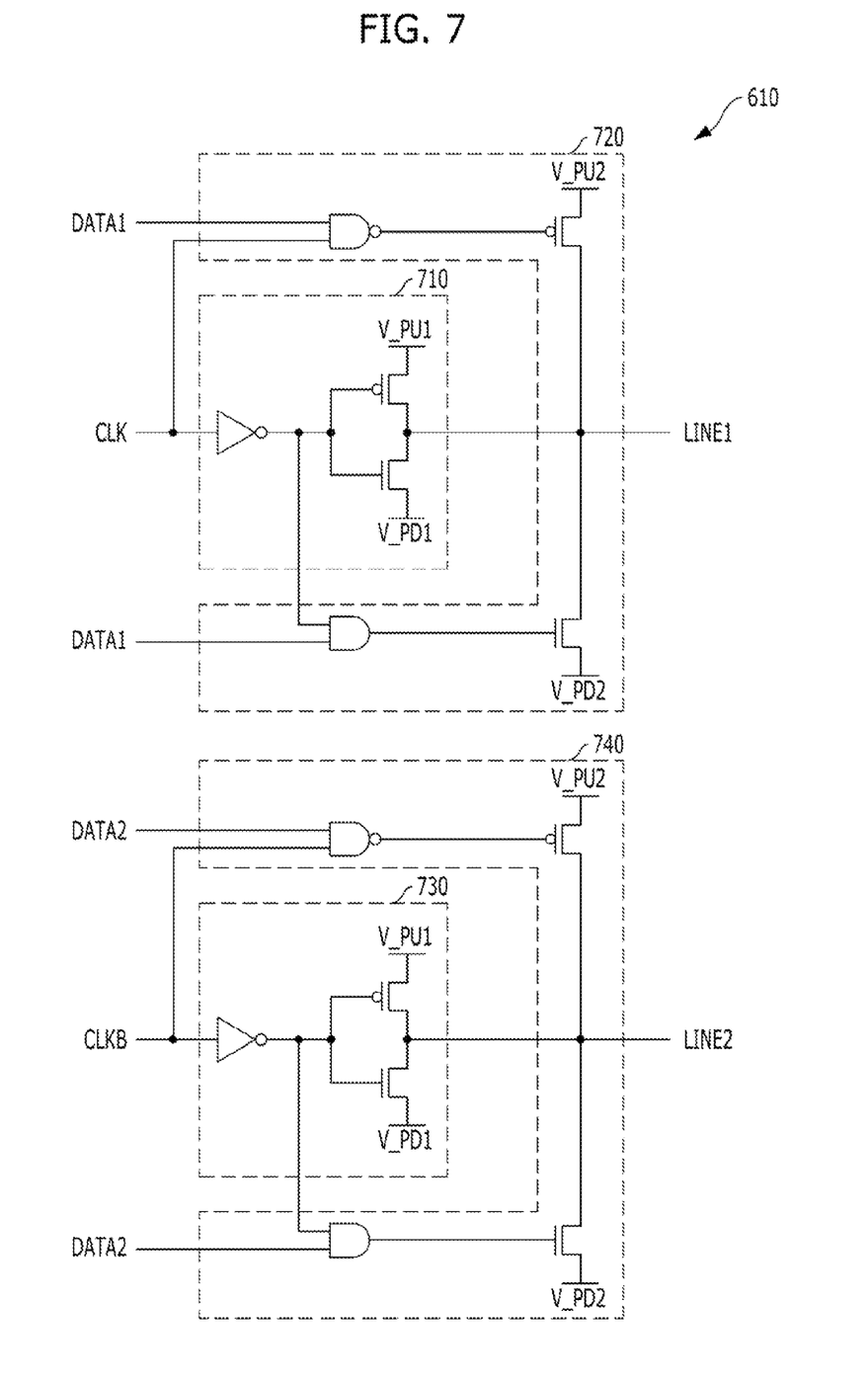
FIG. 7 is a diagram illustrating the configuration of a transmitter circuit 610 shown in FIG. 6 in accordance with an embodiment of the present invention.

FIG. 7 is a diagram illustrating the configuration of a transmitter circuit 610 in FIG. 6 in accordance with another embodiment of the present invention.

Referring to FIG. 7, the transmitter circuit 610 includes a first driver 710, a second driver 720, a third driver 730, and a fourth driver 740.

The first driver 710 receives and drives the positive clock CLK on the first transmission line LINE1. A first pull-up voltage V_PU1 for pull-up driving of the first transmission line LINE1 and a first pull-down voltage V_PD1 for pull-down driving of the first transmission line LINE1 are supplied to the first driver 710.

The second driver 720 also drives the positive clock CLK on the first transmission line LINE1. However, the second driver 720 is activated when the first data DATA1 to be transmitted has a value of "1", and is inactivated when the first data DATA1 to be transmitted has a value of "0". That is, the second driver 720 drives the positive clock CLK on the first transmission line LINE1 if the first data DATA1 to be transmitted has the value of "1", but does not drive the positive clock CLK on the first transmission line LINE1 if the first data DATA1 to be transmitted has the value of "0". A second pull-up voltage V_PU2 for pull-up driving of the first transmission line LINE1 and a second pull-down voltage V_PD2 for pull-down driving of the first transmission line LINE1 are supplied to the second driver 720. The second pull-up voltage V_PU2 is higher than the first pull-up voltage V_PU1, and the second pull-down voltage V_PD2 is lower than the first pull-down voltage V_PD1.

The third driver 730 receives and drives the negative clock CLKB on the second transmission line LINE2. A first pull-up voltage V_PU1 for pull-up driving of the second transmission line LINE2 and a first pull-down voltage V_PD1 for pull-down driving of the second transmission line LINE2 are supplied to the third driver 730.

The fourth driver 740 also drives the negative clock CLKB on the second transmission line LINE2. However, the fourth driver 740 is activated when the second data DATA2 to be transmitted has a value of "1", and is inactivated when the second data DATA2 to be transmitted has a value of "0". That is, the fourth driver 740 drives the negative clock CLKB on the second transmission line LINE2 if the second data DATA2 to be transmitted has the value of "1", but does not drive the negative clock CLKB on the second transmission line LINE2 if the second data DATA2 has the value of "0". A second pull-up voltage V_PU2 for pull-up driving of the second transmission line LINE2 and a second pull-down voltage V_PD2 for pull-down driving of the second transmission line LINE2 are supplied to the fourth driver 740. The second pull-up voltage V_PU2 is higher than the first pull-up voltage V_PU1, and the second pull-down voltage V_PD2 is lower than the first pull-down voltage V_PD1.

The transmitter circuit 610 of FIG. 7 is different from the transmitter circuit 210 of FIG. 3 only on the point that two kinds of clocks CLK and CLKB are transmitted in accordance with two kinds of data DATA1 and DATA2, and operates in the same principle as the transmitter circuit 210 of FIG. 3. Accordingly, the same pull-up voltage and the same pull-down voltage may be supplied to the drivers 710 to 740 as described above with reference to FIG. 3. That is, it may be satisfied that V_PU1=V_PU2 and V_PD1=V_PD2.

If the value of the first data DATA1 input to the transmitter circuit 610 is "0", only the first driver 710 drives the positive clock CLK on the first transmission line LINE1. On the other hand, if the value of the first data DATA1 is "1", the first driver 710 and the second driver 720 simultaneously drive the positive clock CLK on the first transmission line LINE1. Accordingly, the amplitude of the positive clock CLK driven on the first transmission line LINE1 may be changed depending on the value of the first data DATA1.

If the value of the second data DATA2 input to the transmitter circuit 610 is "0", only the third driver 730 drives the negative clock CLKB on the second transmission line LINE2, while if the value of the second data DATA2 is "1", the third driver 730 and the fourth driver 740 simultaneously drive the negative clock CLKB on the second transmission line LINE2. Accordingly, the amplitude of the negative clock CLKB driven on the second transmission line LINE2 is changed depending on the value of the second data DATA2.

Figure 8:
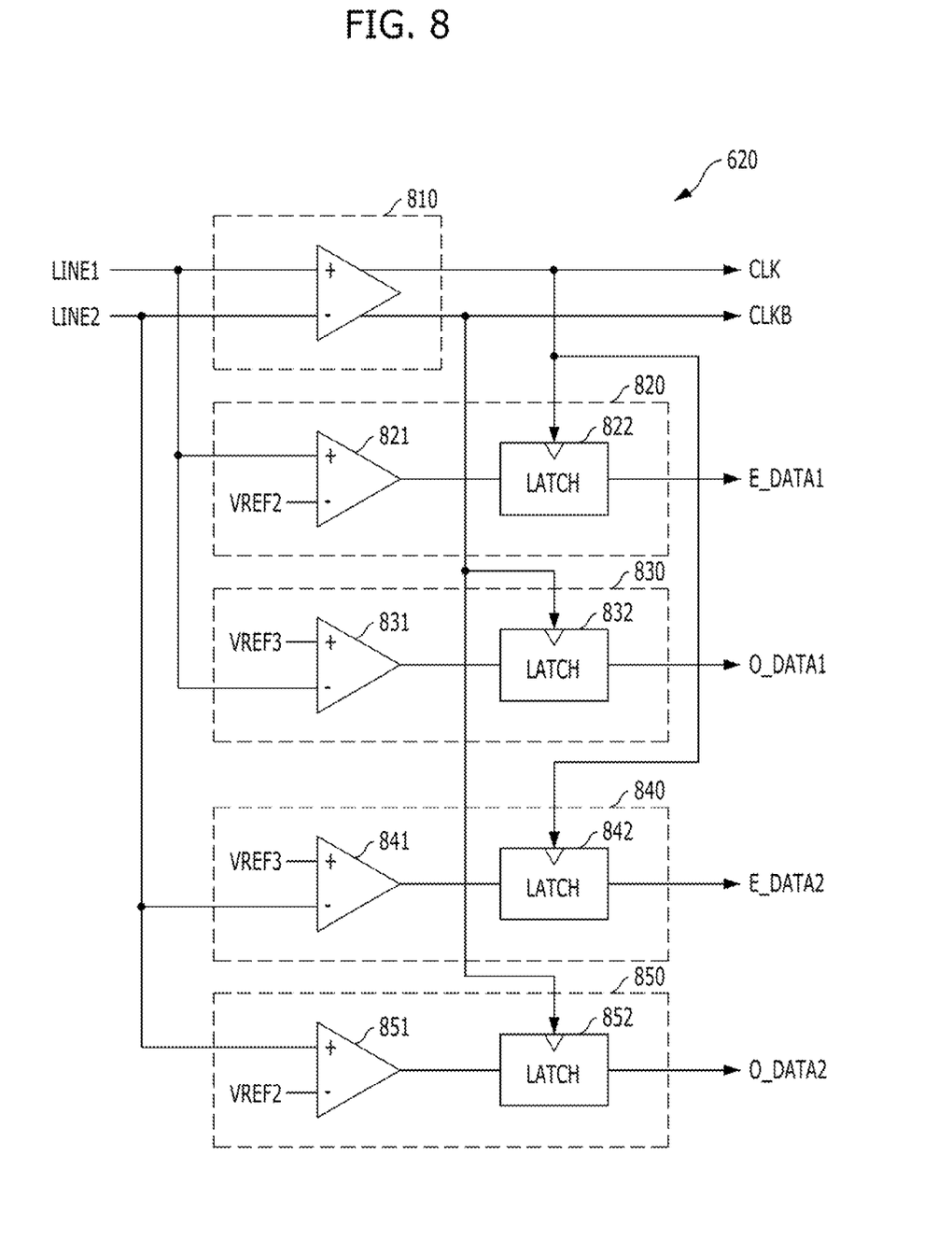
FIG. 8 is a diagram illustrating the configuration of a receiver circuit 620 shown in FIG. 6 in accordance with an embodiment of the present invention.

FIG. 8 is a diagram illustrating the configuration of a receiver circuit 620 shown in FIG. 6 in accordance with another embodiment of the present invention.

Referring to FIG. 8, the receiver circuit 620 includes a clock receiving unit 810 recovering the clocks CLK and CLKB and data receiving units 820 to 850 recovering the data DATA1 and DATA2. The data receiving unit includes a first even data receiving unit 820, a first odd data receiving unit 830, a second even data receiving unit 840, and a second odd data receiving unit 850.

The clock receiving unit 810 recovers the positive clock CLK and the negative clock CLKB through comparison of the level of the signal received through the first transmission line LINE1 with the level of the signal received through the second transmission line LINE2. If the signal of the first transmission line LINE1 is higher than the signal of the second transmission line LINE2, the clock receiving unit 810 outputs the positive clock CLK of logic value "1" and the negative clock CLKB of logic value "0", and if the signal of the second transmission line LINE2 is higher than the signal of the first transmission line LINE1, the clock receiving unit 810 outputs the positive clock CLK of logic value "0" and the negative clock CLKB of logic value "1". The clock receiving unit 810 may be a differential buffer with differential input-differential output.

The first even data receiving unit 820 recovers first even data E_DATA1 from the signal received through the first transmission line LINE1. The first even data E_DATA1 is synchronized with a period of logic level "1" of the positive clock CLK. The first even data receiving unit 820 recovers the first even data E_DATA1 by comparing the level of the signal received through the first transmission line LINE1 with the level of the second reference voltage VREF2 and by sampling the result of comparison in synchronization with the positive clock CLK. The first even data receiving unit 820 may include a differential buffer 821 and a latch 822. The differential buffer 821 compares the signal received through the first transmission line LINE1 with the second reference voltage VREF2, and outputs the signal whose logical value is "1" if the signal received through the first transmission line LINE1 is higher than the second reference voltage VREF2, and outputs the signal whose logical value is "0" if the signal received through the first transmission line LINE1 is lower than the second reference voltage VREF2. Further, the latch 822 latches the output of the differential buffer 821 in synchronization with the level "1" of the positive clock CLK. The signal latched in the latch 822 becomes the first even data E_DATA1. A value of the second reference voltage VREF2 is set between the relatively greater amplitude and the relatively smaller amplitude of the positive clock CLK whose logical level is "1". As described above in connection with FIG. 6, the transmitter circuit 610 transmits the positive clock CLK with relatively greater amplitude when the first data DATA1 to be transmitted is "1". On the other hand, the transmitter circuit 610 transmits the positive clock CLK with relatively smaller amplitude when the first data DATA1 to be transmitted is "0".

The first odd data receiving unit 830 recovers first odd data O_DATA1 from the signal received through the first transmission line LINE1. The first odd data O_DATA1 is synchronized with the period of logic level "1" of the negative clock CLKB. The first odd data receiving unit 830 recovers the first odd data O_DATA1 by comparing the level of the signal that is received through the first transmission line LINE1 with the level of the third reference voltage VREF3 and by sampling the result of comparison in synchronization with the negative clock CLKB. The first odd data receiving unit 830 may include a differential buffer 831 and a latch 832. The differential buffer 831 compares the signal received through the first transmission line LINE1 with the third reference voltage VREF3, and outputs the signal that has a logical value of "1" if the signal received through the first transmission line LINE1 is lower than the third reference voltage VREF3 and outputs the signal that has a logical value of "0" if the signal received through the first transmission line LINE1 is higher than the third reference voltage VREF3. Further, the latch 832 latches the output of the differential buffer 831 in synchronization with the level "1" of the negative clock CLKB. The signal latched in the latch 832 becomes the first odd data O_DATA1. Here, the third reference voltage VREF3 is a reference voltage lower than the first reference voltage VREF1. An absolute value of the third reference voltage VREF3 is set between the relatively greater amplitude and the relatively smaller amplitude of the positive clock CLK or the negative clock CLKB whose logical level is "1".

The second even data receiving unit 840 recovers second even data E_DATA2 from the signal received through the second transmission line LINE2. The second even data E_DATA2 is synchronized with the period of logic level "1" of the positive clock CLK. The second even data receiving unit 840 recovers the second even data E_DATA2 by comparing the level of the signal received through the second transmission line LINE2 with the level of the third reference voltage VREF3 and by sampling the result of comparison in synchronization with the positive clock CLK. The second even data receiving unit 840 may include a differential buffer 841 and a latch 842. The differential buffer 841 compares the signal received through the second transmission line LINE2 with the third reference voltage VREF3, and outputs the signal that has a logical value of "1" if the signal received through the second transmission line LINE2 is lower than the third reference voltage VREF3 and outputs the signal that has a logical value of "0" if the signal received through the second transmission line LINE2 is higher than the third reference voltage VREF3. Further, the latch 842 latches the output of the differential buffer 841 in synchronization with the level "1" of the positive clock CLK. The signal latched in the latch 842 becomes the second even data E_DATA2.

The second odd data receiving unit 850 recovers second odd data O_DATA2 from the signal received through the second transmission line LINE2. The second odd data O_DATA2 is synchronized with the period of logic level "1" of the negative clock CLKB. The second odd data receiving unit 850 recovers the second odd data O_DATA2 by comparing the level of the signal that is received through the second transmission line LINE2 with the level of the second reference voltage VREF2 and by sampling the result of comparison in synchronization with the negative clock CLKB. The second odd data receiving unit 850 may include a differential buffer 851 and a latch 852. The differential buffer 851 compares the signal received through the second transmission line LINE2 with the second reference voltage VREF2, and outputs the signal that has a logical value of "1" if the signal received through the second transmission line LINE2 is higher than the second reference voltage VREF2 and outputs the signal that has a logical value of "0" if the signal received through the second transmission line LINE2 is lower than the second reference voltage VREF2. Further, the latch 852 latches the output of the differential buffer 851 in synchronization with the level "1" of the negative clock CLKB. The signal latched in the latch 852 becomes the second odd data O_DATA2.

Figure 9:
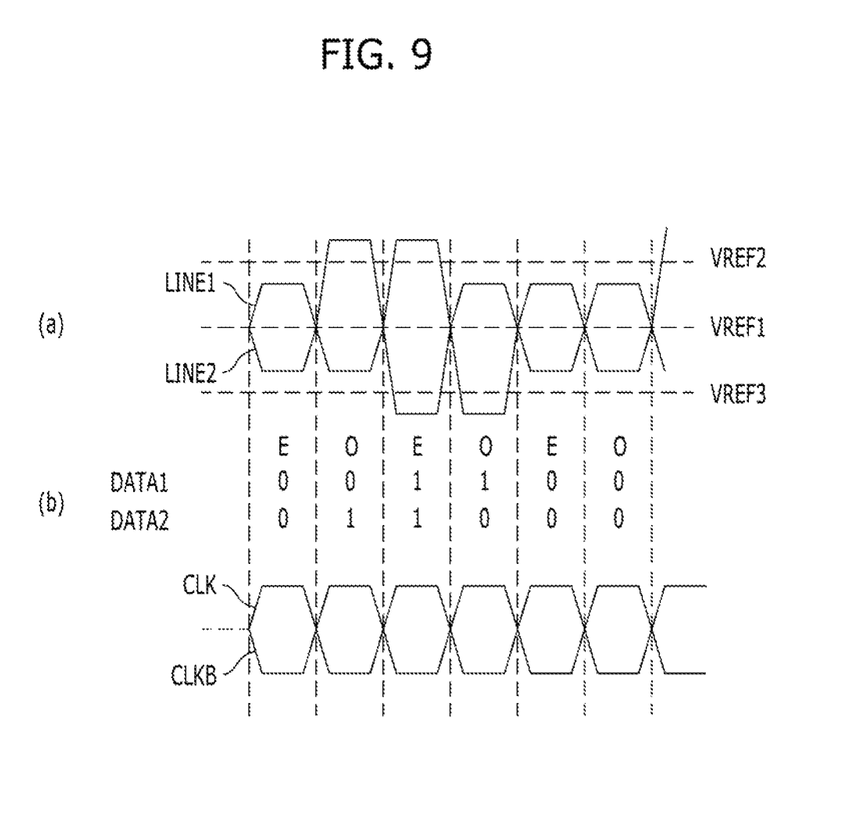
FIG. 9 is a diagram explaining operations of the transmitter circuit 610 and the receiver circuit 620 illustrated in FIGS. 6 to 8.

FIG. 9 is a diagram explaining operations of the transmitter circuit 610 and the receiver circuit 620 illustrated in FIGS. 6 to 8.

The levels of the signals on the transmission lines LINE1 and LINE2 are shown in (a) of FIG. 9, and the levels of the clocks CLK and CLKB and the data DATA1 and DATA2 that the receiver circuit 620 recovers using the signal levels of the transmission lines LINE1 and LINE2 are shown in (b) of FIG. 9. In (b) of FIG. 9, data indicated by "E" denotes the even data E_DATA1 and E_DATA2, and data indicated by "O" denotes the odd data O_DATA1 and O_DATA2.

Referring to FIG. 9, the transmitter circuit 610 adjusts the amplitude of the positive clock CLK and negative clock CLKB in accordance with the level of the first data DATA1 and the second data DATA2, respectively, and the receiver circuit 620 recovers the positive clock CLK and the negative clock CLKB using the logical values of the signals transmitted from the transmitter circuit 610 and recovers the first data DATA1 and the second data DATA2 using the amplitudes of the signals transmitted from the transmitter circuit 610.

In the above-described embodiments, it is exemplified that the transmitter circuit increases the amplitude of the transmitted clock if the data is "1" and decreases the amplitude of the clock if the data is "0". However, the reverse is also possible.

Further, the scope of the present invention may expand to the case of more than 2 of the data to be transmitted. For example, it may be also possible that a plurality (for example, 8) of transmission lines are provided between the transmitter circuit and the receiver circuit. The above-described transmitting method according to the embodiment is used in the two transmission lines, and the same data transmitting method as in the related art is used in the 6 remaining transmission lines.

Further, the signal value may be fixed to "0" on the transmission line in a period when there is no data to be transmitted, and the clock having constant amplitude may be transmitted to the transmission line according to data to be transmitted, where the clock functions as the data of logical value "1" or "0" as well as the clock itself.

Although various embodiments have been described for illustrative purposes, it will be apparent to those skilled in the art that various changes and modifications may be made without departing from the spirit and scope of the invention as defined in the following claims.

What is claimed is:

1. A transmitting/receiving system comprising:
a transmission line;
a transmitter circuit configured to transmit a clock to the transmission line and to adjust an amplitude of the clock in accordance with a logic level of data; and
a receiver circuit configured to receive the clock transferred to the transmission line and to recover the data through detection of the amplitude of the clock,
wherein the transmitter circuit comprises:
a first driver configured to drive the clock on the transmission line; and
a second driver configured to drive the clock on the transmission line and to be activated if the data is of a first level and to be inactivated if the data is of a second level.

2. A transmitting/receiving system comprising:
a transmission line;
a transmitter circuit configured to transmit a clock to the transmission line and to adjust an amplitude of the clock in accordance with a logic level of data; and
a receiver circuit configured to receive the clock transferred to the transmission line and to recover the data through detection of the amplitude of the clock,
wherein the receiver circuit comprises:
a clock receiving unit configured to recover the clock by comparing a level of a signal that is received through the transmission line with a level of a first reference voltage;
an even data receiving unit configured to recover even data by comparing the level of the signal that is received through the transmission line with a level of a second reference voltage and by sampling the result of comparison in synchronization with the clock that is recovered by the clock receiving unit; and
an odd data receiving unit configured to recover odd data by comparing the level of the signal that is received through the transmission line with a level of a third reference voltage and by sampling the result of comparison in synchronization with a signal obtained by reversing the clock that is recovered by the clock receiving unit.

3. The transmitting/receiving system of claim 2, wherein the second reference voltage is higher than the first reference voltage, and the third reference voltage is lower than the first reference voltage.

4. The transmitting/receiving system of claim 1, wherein the transmitter circuit and the receiver circuit are provided in different chips.

5. A transmitter circuit comprising:
a first driver configured to drive a clock on a transmission line; and
a second driver configured to drive the clock on the transmission line and to be activated if data is of a first level and to be inactivated if the data is of a second level,
wherein the first driver operates to receive a first pull-up voltage and a first pull-down voltage, and
the second driver operates to receive a second pull-up voltage that is higher than the first pull-up voltage and a second pull-down voltage that is lower than the first pull-down voltage.

6. A receiver circuit comprising:
a clock receiving unit configured to recover a clock through detection of logic high and logic low of a signal received through a transmission line; and
a data receiving unit configured to recover data through detection of an amplitude of the signal received through the transmission line,
wherein the clock receiving unit recovers the clock by comparing a logic level of a signal that is received through the transmission line with a logic level of a first reference voltage, and
wherein the data receiving unit comprises:
an even data receiving unit configured to recover even data by comparing the signal that is received through the transmission line with a second reference voltage and by sampling the result of comparison in synchronization with the clock that is recovered by the clock receiving unit; and
an odd data receiving unit configured to recover odd data by comparing the signal that is received through the transmission line with a third reference voltage and by sampling the result of comparison in synchronization with a signal obtained by reversing the clock that is recovered by the clock receiving unit.

7. The receiver circuit of claim 6, wherein the second reference voltage is higher than the first reference voltage, and the third reference voltage is lower than the first reference voltage.

8. The receiver circuit of claim 6, wherein the even data receiving unit includes:
a first differential buffer configured to compare the signal that is received through the transmission line with the second reference voltage and to output a first result of comparison; and
a first latch configured to latch an output signal of the first differential buffer in synchronization with the recovered clock, and
the odd data receiving unit includes:
a second differential buffer configured to compare the signal that is received through the transmission line with the third reference voltage and to output a second result of comparison; and
a second latch configured to latch an output signal of the second differential buffer in synchronization with the reverse signal of the recovered clock.

9. A transmitting/receiving system comprising:
a first transmission line;
a second transmission line;
a first transmitting unit configured to transmit a positive clock to the first transmission line and to adjust an amplitude of the positive clock in accordance with a logic level of first data;
a second transmitting unit configured to transmit a negative clock to the second transmission line and to adjust an amplitude of the negative clock in accordance with a logic level of second data; and
a receiver circuit configured to receive the first clock and the second clock transferred to the first transmission line and the second transmission line, to recover the first data through detection of the amplitude of the received positive clock, and to recover the second data through detection of the amplitude of the received negative clock.

10. The transmitting/receiving system of claim 9, wherein the first transmitting unit includes:
a first driver configured to drive the positive clock on the first transmission line; and
a second driver configured to drive the positive clock on the first transmission line and to be activated if the first data is of a first level and to be inactivated if the first data is of a second level, and
the second transmitting unit includes:
a third driver configured to drive the negative clock on the second transmission line; and
a fourth driver configured to drive the negative positive clock on the second transmission line and to be activated if the second data is of the first level and to be inactivated if the second data is of the second level.

11. The transmitting/receiving system of claim 9, wherein the receiver circuit comprises:
a clock receiving unit configured to recover the positive clock and the negative clock by comparing a level of a signal that is received through the first transmission line with a level of a signal that is received through the second transmission line;
a first even data receiving unit configured to recover first even data by comparing the level of the signal that is received through the first transmission line with a level of a first reference voltage and by sampling the result of comparison in synchronization with the positive clock that is recovered by the clock receiving unit;
a first odd data receiving unit configured to recover first odd data by comparing the level of the signal that is received through the first transmission line with a level of a second reference voltage and by sampling the result of comparison in synchronization with the negative clock that is recovered by the clock receiving unit;
a second even data receiving unit configured to recover second even data by comparing the level of the signal that is received through the second transmission line with the level of the second reference voltage and by sampling the result of comparison in synchronization with the positive clock that is recovered by the clock receiving unit; and
a second odd data receiving unit configured to recover second odd data by comparing the level of the signal that is received through the second transmission line with the level of the first reference voltage and by sampling the result of comparison in synchronization with the negative clock that is recovered by the clock receiving unit.

12. The transmitting/receiving system of claim 11, wherein the level of the first reference voltage is higher than a level of a voltage that is a basis of determining logic high and logic low, and the level of the second reference voltage is lower than the level of the voltage that is the basis of determining logic high and logic low.

13. The transmitting/receiving system of claim 9, wherein the first transmitting unit and the second transmitting unit are provided in a first chip, and the receiver circuit is provided in a second chip.

* * * * *